US011468346B2

(12) United States Patent
Bellert

(10) Patent No.: US 11,468,346 B2
(45) Date of Patent: Oct. 11, 2022

(54) IDENTIFYING SEQUENCE HEADINGS IN A DOCUMENT

(71) Applicant: Konica Minolta Business Solutions U.S.A., Inc., San Mateo, CA (US)

(72) Inventor: Darrell Bellert, Boulder, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 864 days.

(21) Appl. No.: 16/370,724

(22) Filed: Mar. 29, 2019

(65) Prior Publication Data

US 2020/0311571 A1 Oct. 1, 2020

(51) Int. Cl.
*G06N 5/04* (2006.01)
*G06F 40/258* (2020.01)

(52) U.S. Cl.
CPC ............ *G06N 5/04* (2013.01); *G06F 40/258* (2020.01)

(58) Field of Classification Search
CPC ...... G06F 40/258; G06F 40/211; G06F 16/93; G06F 40/117; G06F 40/205; G06F 40/28; G06N 5/04; G06V 30/414; G06V 30/416; G06V 30/153
See application file for complete search history.

(56) References Cited

U.S. PATENT DOCUMENTS

| 6,298,357 | B1 * | 10/2001 | Wexler | G06F 40/258 715/210 |
| 7,937,338 | B2 * | 5/2011 | Boguraev | G06F 40/137 709/205 |
| 8,352,857 | B2 * | 1/2013 | Filippova | G06F 40/134 715/256 |
| 9,001,390 | B1 * | 4/2015 | Zernik | H04N 1/40 358/448 |
| 10,108,695 | B1 * | 10/2018 | Yeturu | G06F 16/955 |
| 10,592,593 | B2 * | 3/2020 | Whetsell | G06F 40/258 |
| 2004/0006742 | A1 * | 1/2004 | Slocombe | G06F 40/157 715/201 |
| 2007/0196015 | A1 * | 8/2007 | Meunier | G06F 40/258 707/999.1 |
| 2010/0306260 | A1 * | 12/2010 | Dejean | G06V 30/416 707/811 |
| 2011/0044539 | A1 * | 2/2011 | Kimura | G06V 30/414 382/176 |
| 2011/0075932 | A1 * | 3/2011 | Komaki | G06V 30/414 382/190 |

(Continued)

FOREIGN PATENT DOCUMENTS

EP 1679623 A2 7/2006

*Primary Examiner* — Amy M Levy
(74) *Attorney, Agent, or Firm* — Osha Bergman Watanabe & Burton LLP

(57) ABSTRACT

A method for processing an electronic document (ED) to infer a sequence of section headings in the ED. The method includes generating, by a computer processor, based on regular expression matching of a predetermined section heading pattern and a plurality of characters in the ED, a list of candidate headings in the ED; generating, by the computer processor and based on the list of candidate headings, a list of chain fragments for inferring a portion of the sequence of section headings; and generating, by the computer processor and based on predetermined criteria, the sequence of section headings by merging at least two chain fragments in the list of chain fragments.

15 Claims, 10 Drawing Sheets

(56) References Cited

U.S. PATENT DOCUMENTS

| | | |
|---|---|---|
| 2012/0197908 A1 | 8/2012 | Unno |
| 2015/0088888 A1 | 3/2015 | Brennan et al. |
| 2015/0169676 A1 | 6/2015 | Bohra et al. |
| 2016/0048482 A1* | 2/2016 | Tsui .................. G06F 16/24578 715/251 |
| 2016/0364608 A1* | 12/2016 | Sengupta .............. G06F 40/258 |
| 2019/0073528 A1* | 3/2019 | Agarwalla ........... G06V 30/413 |
| 2019/0114479 A1* | 4/2019 | Gelosi .................. G06V 30/414 |
| 2020/0034611 A1* | 1/2020 | Hosabettu ............ G06V 10/768 |

* cited by examiner

340 List of Fragments

| Fragment Rank | Fragments | | | | |
|---|---|---|---|---|---|
| 1 | | | | | |

Fragment 6
346

| Position | Family | RANK | Confidence | Text | |
|---|---|---|---|---|---|
| 0 | NUMERIC | 1 | 0.82 | 1. | This is a main heading |
| 2 | NUMERIC | 1 | 0.82 | 2. | This is a second main heading |
| 19 | NUMERIC | 1 | 0.82 | 3. | This is a final main heading. |

Fragment 4
344

| Position | Family | RANK | Confidence | Text | |
|---|---|---|---|---|---|
| 6 | LOWERCASE ROMAN | 1 | 0.36 | i. | Item 1 |
| 7 | LOWERCASE ROMAN | 1 | 0.36 | ii. | Item 2 |
| 8 | LOWERCASE ROMAN | 1 | 0.36 | iii. | Item 3 |
| 9 | LOWERCASE ROMAN | 1 | 0.36 | iv. | Item 4 |

Fragment 3
343

| Position | Family | RANK | Confidence | Text | |
|---|---|---|---|---|---|
| 12 | LOWERCASE ALPHABETIC | 1 | 0.36 | a) | Item a |
| 13 | LOWERCASE ALPHABETIC | 1 | 0.36 | b) | Item b |
| 14 | LOWERCASE ALPHABETIC | 1 | 0.36 | c) | Item c |
| 15 | LOWERCASE ALPHABETIC | 1 | 0.36 | d) | Item d |

| 2 | | | | | |
|---|---|---|---|---|---|

Fragment 5
345

| Position | Family | RANK | Confidence | Text |
|---|---|---|---|---|
| 4 | NUMERIC | 2 | 0.88 | 2.1. This is a subheading |
| 10 | NUMERIC | 2 | 0.88 | 2.2. This is a second subheading |

Fragment 1
341

| Position | Family | RANK | Confidence | Text |
|---|---|---|---|---|
| 18 | NUMERIC | 2 | 0.36 | 2.1 is a good section to read if you haven... |

| 3 | | | | | |
|---|---|---|---|---|---|

Fragment 2
342

| Position | Family | RANK | Confidence | Text |
|---|---|---|---|---|
| 16 | NUMERIC | 3 | 0.94 | 2.2.1. This is a minor heading. |

FIG. 3D

350 Pruned List of Fragments

| Fragment Rank | Fragments | | | |
|---|---|---|---|---|
| 1 | Position | Family | RANK | Confidence | Text |
| | 0 | NUMERIC | 1 | 0.82 | 1. This is a main heading |
| | 2 | NUMERIC | 1 | 0.82 | 2. This is a second main heading |
| | 19 | NUMERIC | 1 | 0.82 | 3. This is a final main heading |

Fragment 6 346

| 2 | Position | Family | RANK | Confidence | Text |
|---|---|---|---|---|---|
| | 4 | NUMERIC | 2 | 0.88 | 2.1. This is a subheading |
| | 10 | NUMERIC | 2 | 0.88 | 2.2. This is a second subheading |

Fragment 5 345

| 3 | Position | Family | RANK | Confidence | Text |
|---|---|---|---|---|---|
| | 16 | NUMERIC | 3 | 0.94 | 2.2.1. This is a minor heading |

Fragment 2 342

FIG. 3E

360 Merged List of Fragments A

| Fragment Rank | Fragments | | | | |
|---|---|---|---|---|---|
| 1 (Fragment 6 346) | Position | Family | RANK | Confidence | Text |
| | 0 | NUMERIC | 1 | 0.82 | 1. This is a main heading |
| | 2 | NUMERIC | 1 | 0.82 | 2. This is a second main heading |
| | 19 | NUMERIC | 1 | 0.82 | 3. This is a final main heading. |
| 2 (Merged Fragment A 361) | Position | Family | RANK | Confidence | Text |
| | 4 | NUMERIC | 2 | 0.88 | 2.1. This is a subheading |
| | 10 | NUMERIC | 2 | 0.88 | 2.2. This is a second subheading |
| | 16 | NUMERIC | 3 | 0.94 | 2.2.1. This is a minor heading. |

FIG. 3F

370 Merged List of Fragments B

| Fragment Rank | Fragments | | | | |
|---|---|---|---|---|---|
| 1 (Merged Fragment B 371) | Position | Family | RANK | Confidence | Text |
| | 0 | NUMERIC | 1 | 0.82 | 1. This is a main heading |
| | 2 | NUMERIC | 1 | 0.82 | 2. This is a second main heading |
| | 4 | NUMERIC | 2 | 0.88 | 2.1. This is a subheading |
| | 10 | NUMERIC | 2 | 0.88 | 2.2. This is a second subheading |
| | 16 | NUMERIC | 3 | 0.94 | 2.2.1. This is a minor heading. |
| | 19 | NUMERIC | 1 | 0.82 | 3. This is a final main heading. |

FIG. 3G

IDENTIFYING SEQUENCE HEADINGS IN A DOCUMENT

BACKGROUND

Content of an electronic document (ED) (e.g., PDF document or OOXML document, etc.) may be organized by the author into sections within the ED. Many different file formats exist. Each file format defines how the content of the file is encoded. Regardless of file formats, semantic information implied by the author, such as sections or section headings, may not be specified using computer-recognizable information within the ED.

SUMMARY

In general, in one aspect, the invention relates to a method for processing an electronic document (ED) to infer a sequence of section headings in the ED. The method includes generating, by a computer processor, based on regular expression matching of a predetermined section heading pattern and a plurality of characters in the ED, a list of candidate headings in the ED; generating, by the computer processor and based on the list of candidate headings, a list of chain fragments for inferring a portion of the sequence of section headings; and generating, by the computer processor and based on predetermined criteria, the sequence of section headings by merging at least two chain fragments in the list of chain fragments.

In general, in one aspect, the invention relates to a non-transitory computer readable medium (CRM) storing computer readable program code for processing an electronic document (ED) to infer a sequence of section headings in the ED embodied therein. The computer readable program code, when executed by a computer, includes functionality for generating, based on regular expression matching of a predetermined section heading pattern and a plurality of characters in the ED, a list of candidate headings in the ED; generating, based on the list of candidate headings, a list of chain fragments for inferring a portion of the sequence of section headings; and generating, based on predetermined criteria, the sequence of section headings by merging at least two chain fragments in the list of chain fragments.

In general, in one aspect, the invention relates to a system for processing an electronic document (ED) to infer a sequence of section headings in the ED. The system includes a memory, and a computer processor connected to the memory and configured to generate, based on regular expression matching of a predetermined section heading pattern and a plurality of characters in the ED, a list of candidate headings in the ED; generate, based on the list of candidate headings, a list of chain fragments for inferring a portion of the sequence of section headings; and generate, based on predetermined criteria, the sequence of section headings by merging at least two chain fragments in the list of chain fragments.

Other aspects of the invention will be apparent from the following description and the appended claims.

BRIEF DESCRIPTION OF DRAWINGS

FIGS. 3A-3G show an implementation example in accordance with one or more embodiments of the invention.

DETAILED DESCRIPTION

Figure 1:
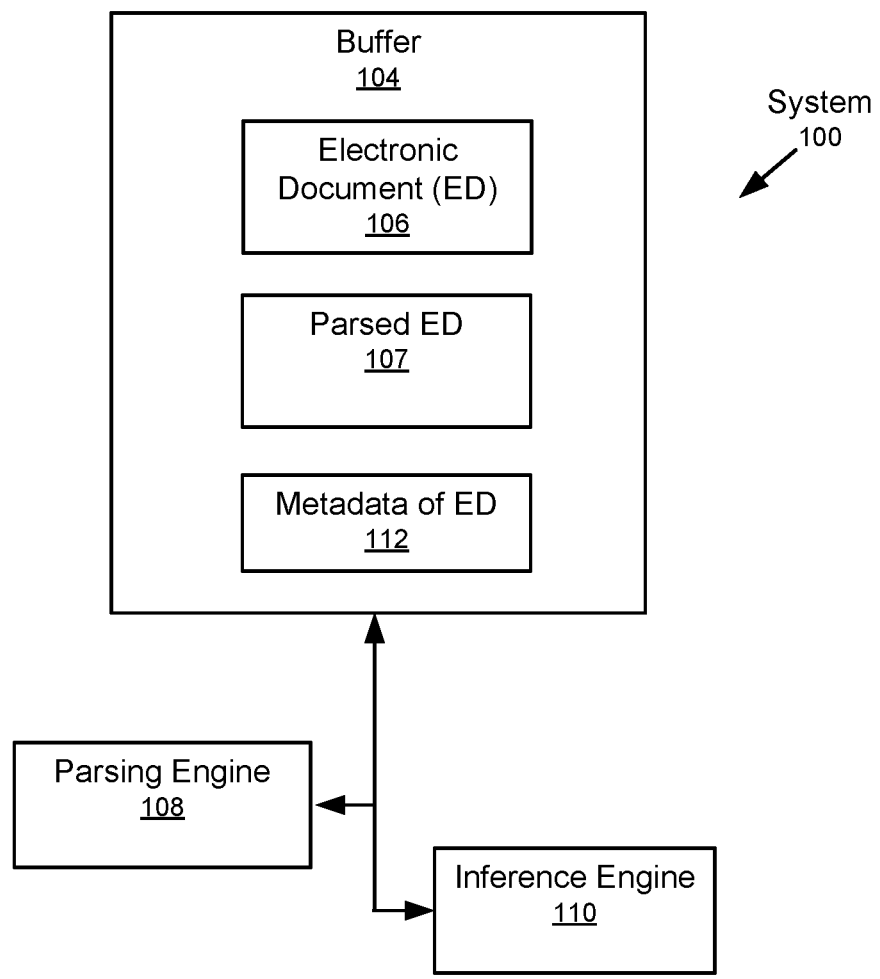
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Some electronic documents (EDs), such as PDF documents or OOXML documents, do not explicitly identify the sections or section headings of the document. In particular, a section heading is a piece of text implied by the author to start a section of the ED. To gain more meaningful insights, users may request to view or search for information in specific sections of large documents. For example, a user may request to retrieve information regarding a specific section in a document by issuing a command such as "Show me the section of this document that talks about the feeding habits of the western sage grouse." In response, the sections and/or section headings of the document, if not explicitly identified, need to be inferred to facilitate targeted queries.

In general, embodiments of the invention provide a method, non-transitory computer readable medium, and system for inferring certain texts as sequenced section headings in an ED. In one or more embodiments of the invention, sequenced section headings are section headings in a sequence where each section heading has one or more sequence characters (e.g., 1.1, 1.2, 1.2.1, a., b., i., ii., iii., iv., etc.) in the leading position (i.e., leftmost position) of the section heading. In particular, the sequence characters may be segregated by punctuation(s). The sequence characters in subsequent sequenced section headings follow each other in the sequence. All sequence characters in a sequence heading are of the same family type, which is one of numeric character, upper case Roman numerals, lower case Roman numerals, upper case alphabetic character, and lower case alphabetic character. Accordingly, section headings may be grouped into one or more of 5 possible families including NUMERIC, UPPER CASE ROMAN, LOWER CASE ROMAN, UPPER CASE ALPHABETIC, and LOWER CASE ALPHABETIC based on the sequence character(s) of the section headings.

In one or more embodiments of the invention, the inferred section heading information is inserted or otherwise embedded, e.g., specified as OOXML tags or some other standard, in the ED that previously lacks computer-recognizable identification of sections or section headings. For example, the inferred section heading information may be inserted or otherwise embedded near corresponding texts in the ED, or in other ways, such as in a document property. Further, the final document with embedded inferred information may be in OOXML, PDF, or any other file format that allows searching through standard text searching tools in an operating system or software application.

FIG. 1 shows a system (100) in accordance with one or more embodiments of the invention. As shown in FIG. 1, the system (100) has multiple components, including, for example, a buffer (104), a parsing engine (108), and an inference engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an ED (106) including one or more lines of text made up of characters. The ED (106) may also include images and graphics. The ED (106) may be obtained (e.g., downloaded, scanned, etc.) from any source. The ED (106) may be a part of a collection of EDs. Further, the ED (106) may be of any size and in any format (e.g., PDF, OOXML, ODF, HTML, etc.). The ED (106) includes semantic content implied by the author as sections and section headings, which are not specified or explicitly identified by the ED (106) itself. In other words, the sections and section headings are not specified or explicitly identified using computer-recognizable information, such as tags or other identifiers, in the ED (106).

In one or more embodiments of the invention, the parsing engine (108) may be implemented in hardware (i.e., circuitry), software, or any combination thereof. The parsing engine (108) parses the ED (106) to extract content, layout, and styling information of the characters in the ED (106), and generates a parsed version of the ED (106), referred to as the parsed ED (107), based on the extracted information. In particular, the parsed ED (107) includes representations of the original contents via the extracted information of the ED (106). The parsed ED (107) may be stored in the buffer (104).

In one or more embodiments, the parsed ED (107) is in a common predetermined structured format such as JSON or XML that is encoded with the extracted information from the ED (106). This common format stores the paragraphs, lines, and runs of text as well as corresponding bounding boxes and styling information. Furthermore, this common format may store additional document content, such as images and graphics. An example of the ED (106) and the parsed ED (107) is depicted in FIG. 3A and FIG. 3B, respectively.

Figure 3A:
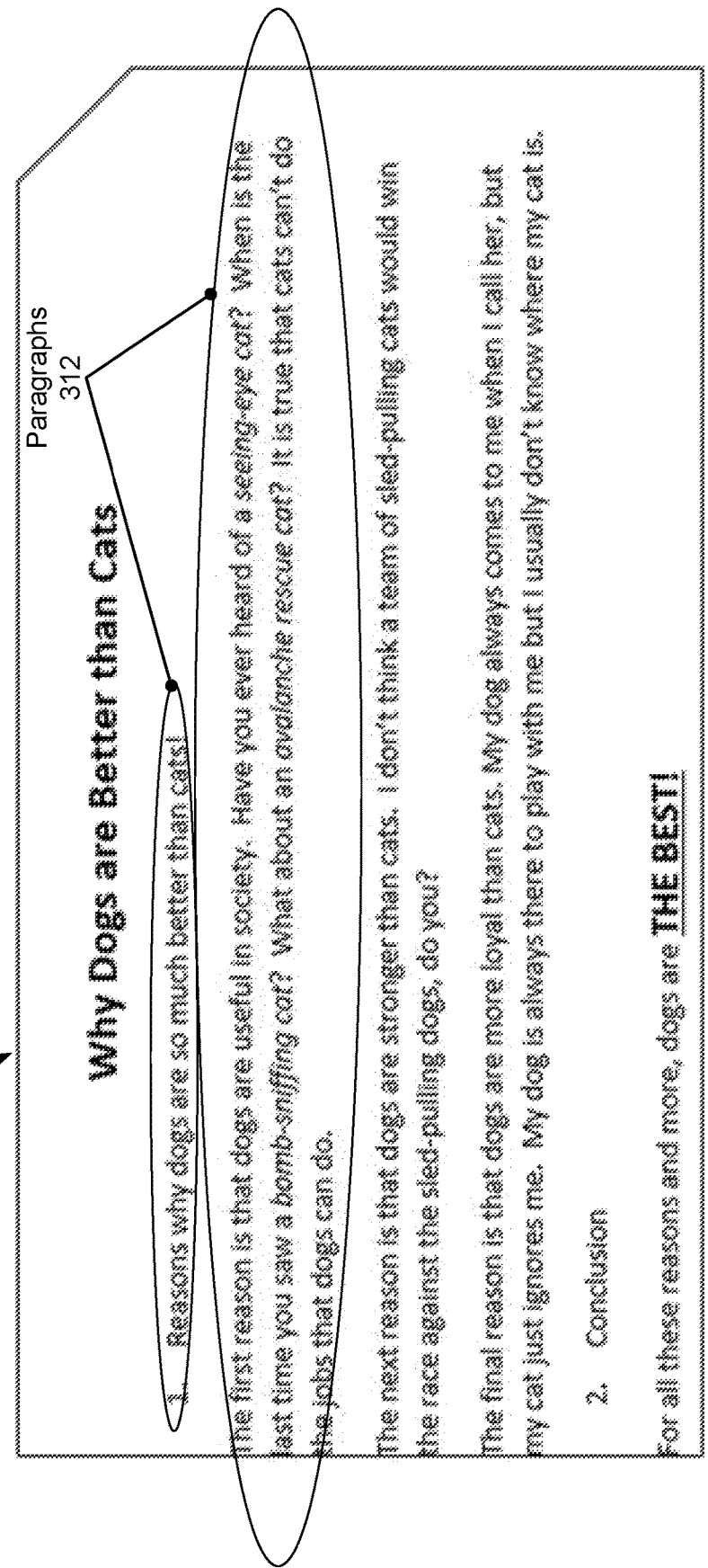

As shown in FIG. 3A, an ED A (310) is an example of the ED (106) and includes multiple lines of text made up of characters. The lines of text may be grouped into paragraphs (312). As seen in FIG. 3A, each paragraph may include a single line or multiple lines of text. After the ED A (310) is parsed, a representation of the common format for a subset of the document is shown in FIG. 3B.

Figure 3B:
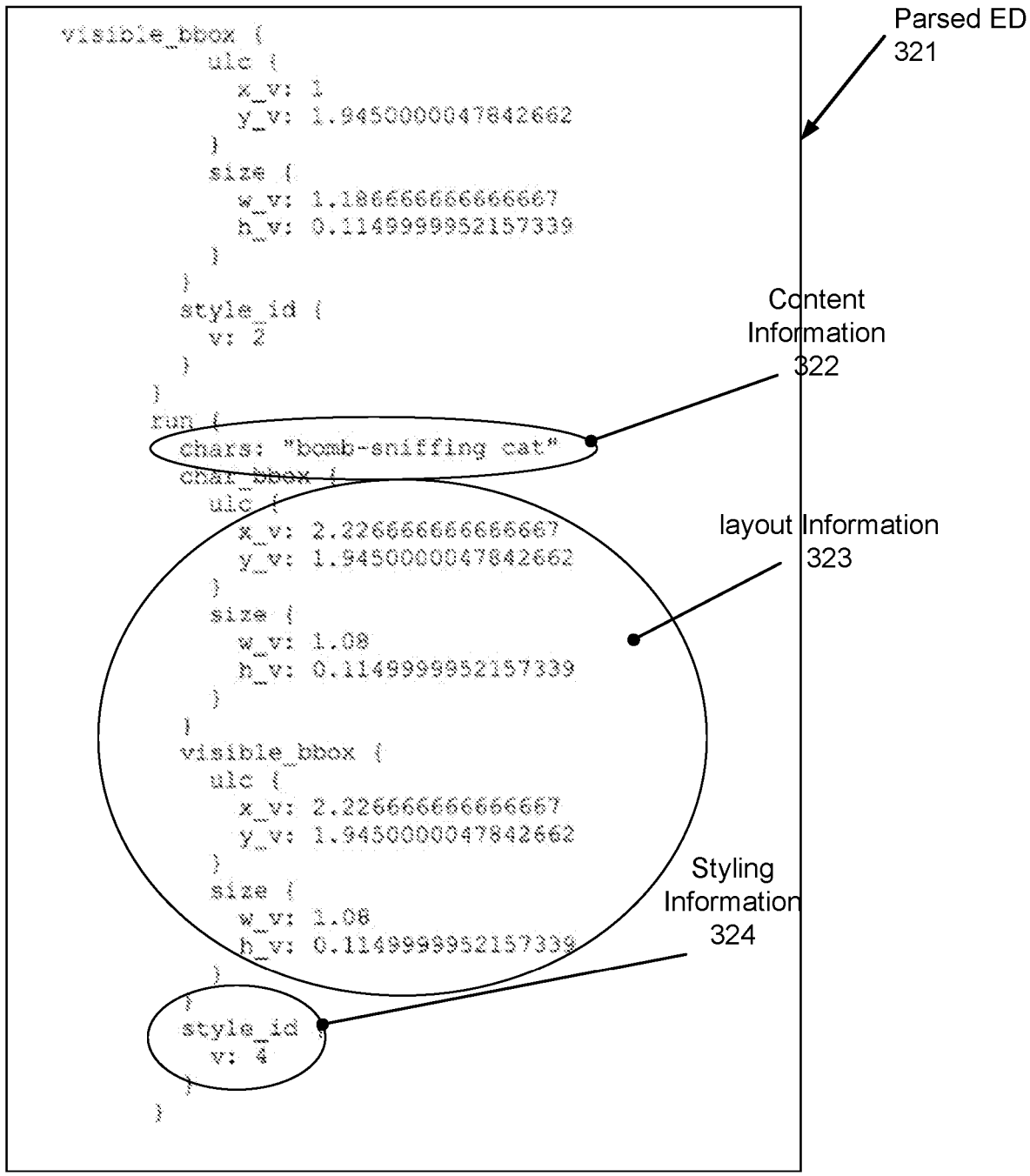

FIG. 3B shows a portion of a parsed version of the ED A (310), referred to as the parsed ED (321). The parsed ED (321) is an example of the parsed ED (107) and includes styling information (324), layout information (323), and content information (322) for the characters in the third paragraph of the ED A (310). For example, content information (322) includes characters "bomb-sniffing cat" shown in FIG. 3A. As seen in FIG. 3B, the styling information (324) is presented as a variable (i.e., v: 4) that defines various features or aspects (i.e., styling) of the text (i.e., style_id). In particular, content information (322) includes all of the characters in the line of text that are applied with the styling information (324).

Although the above is exemplary only, the common format identifies the underlying structure and styling details of the document. In particular, specific paragraphs in the document are identified, with each paragraph broken up into one or more lines of text. Furthermore, each line is broken up into one or more runs of text, where all text in a run has specific styling information. In the example above, the styling information is handled through reference IDs (with the exact styling details for a particular ID appearing in a "run_props" list at the end of the file). In other examples, the styling information may also be encoded inline with the runs themselves. Regardless, the styling details encode information such as typeface, point size, text color, bold, underline, and italic treatments. In addition to styling information, layout information (e.g., layout information (323)) is provided via the char_bbox/visible_bbox which identifies different bounding boxes of paragraphs, lines, and runs. Finally, the text of the document itself is provided as part of each run.

Returning to the discussion of FIG. 1, in one or more embodiments of the invention, the inference engine (110) may be implemented in hardware (i.e., circuitry), software, or any combination thereof. In particular, the inference engine (110) is configured to infer certain texts in the parsed ED (107) as sequenced section headings of the ED (106). Based on the content information and styling attributes extracted by the parsing engine (108), the inference engine (110) generates candidate headings in the ED (106) that are assembled into a number of chain fragments to construct a portion of a sequence of section headings. Lower rank chain fragment(s) are merged into higher rank chain fragment(s) to generate the full sequence of section headings. As used herein, the candidate heading is a piece of text that is a candidate to be identified as a section heading. A chain fragment, or simply referred to as a fragment, is one or more candidate headings that may be qualified as a portion of the sequence of section headings. Throughout this disclosure, the terms "candidate heading" and "heading" may be used interchangeably unless explicitly specified as "section heading."

In one or more embodiments of the invention, the inference engine (110) generates metadata (112) of the ED (106) that corresponds to one or more intermediate results of the inference engine (110), such as the candidate headings, confidence measures and ranking measures of the candidate headings, chain fragments, parent/child relationships of the chain fragments, etc. In other words, the metadata (112) includes information that represents one or more intermediate results of the inference engine (110). In one or more embodiments, the inference engine (110) stores the metadata (112) in the buffer (104). Alternatively, in one or more embodiments, the inference engine (110) stores the metadata (112) back into the parsed ED (107). The metadata (112) may be stored in an external buffer and retrieved by the inference engine (110) for use.

In one or more embodiments of the invention, the inference engine (110) performs the functionalities described above using the method described in reference to FIG. 2A below.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2A:
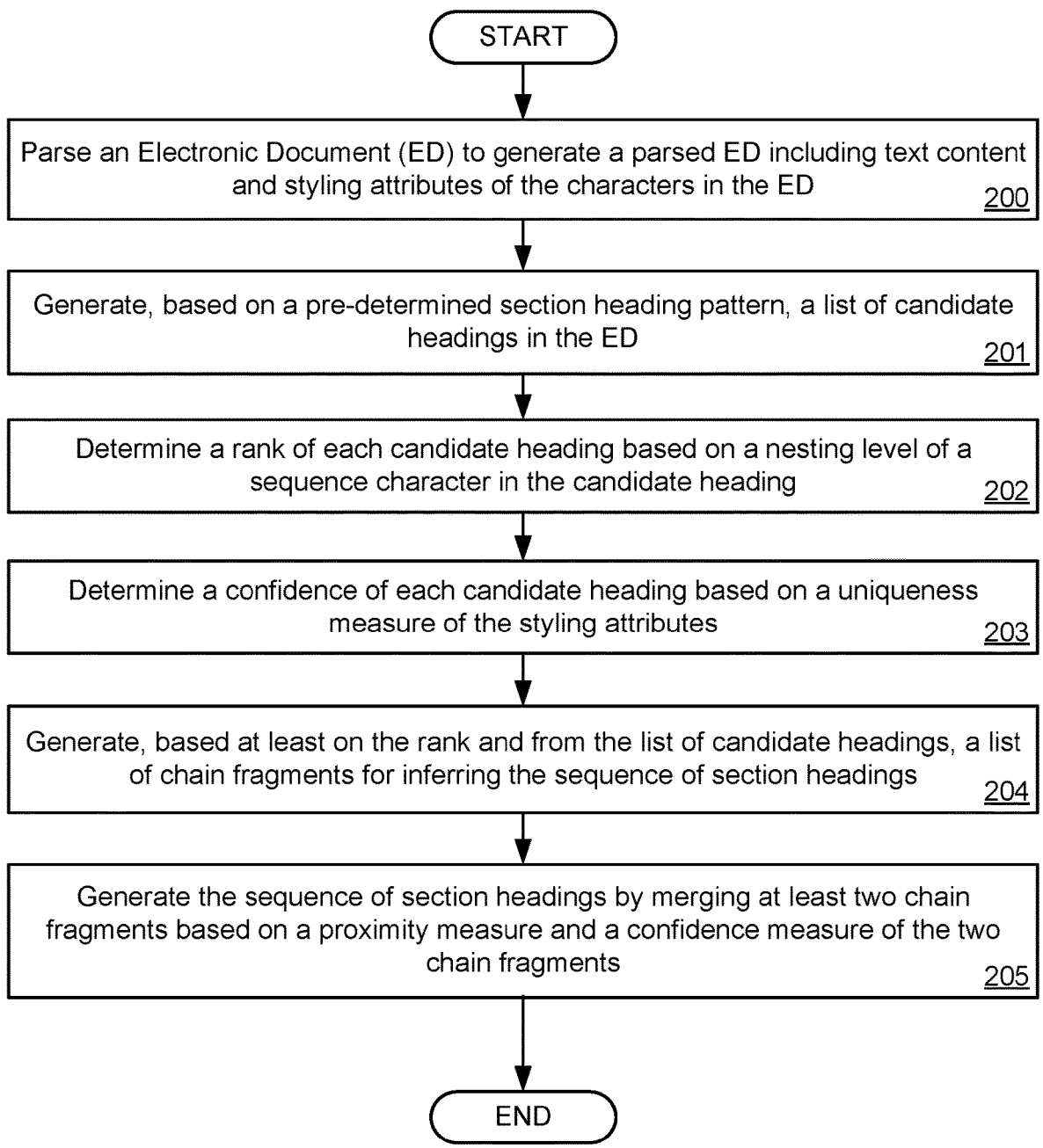
FIGS. 2A-2B shows a flowchart in accordance with one or more embodiments of the invention.

FIG. 2A shows a flowchart in accordance with one or more embodiments of the invention. The flowchart depicts a process for inferring one or more sequenced section headings in an electronic document (ED). One or more of the steps in FIG. 2A may be performed by the components of the system (100), discussed above in reference to FIG. 1. In one or more embodiments of the invention, one or more of the steps shown in FIG. 2A may be omitted, repeated, and/or performed in a different order than the order shown in FIG. 2A. Accordingly, the scope of the invention should not be considered limited to the specific arrangement of steps shown in FIG. 2A.

Referring to FIG. 2A, initially in Step 200, an ED is parsed to generate a parsed version of the ED including styling attributes, layout attributes, and content information of the characters. In particular, the ED includes sections and section headings that are not specified or explicitly identified using computer-recognizable information, such as tags or other identifiers, in the ED.

In Step 201 according to one or more embodiments, a list of candidate headings in the ED are generated based on a predetermined section heading pattern. In one or more embodiments of the invention, the predetermined section heading pattern is a "regular expression," which is a sequence of characters that defines a search pattern. The candidate headings are pieces of text in the ED that match the regular expression for inferring the sequence of section headings ("regular expression matching"). A pattern of <sequence characters> <text> is used as the regular expression for searching candidate headings in the ED. In other words, a piece of text that has a pattern of <sequence characters> <text> is identified as one of the candidate headings. In this context, a candidate heading includes a <sequence characters> portion and a <text> portion, which are referred to as the sequence characters and the text of the candidate heading. The candidate heading includes a single paragraph in the ED. In other words, the candidate headings are delimited by corresponding paragraph bounding boxes. The list of candidate headings is sorted according to paragraph numbers of the candidate headings, and generating the list of candidate headings includes generating metadata that identifies the candidate headings in the list and storing the metadata in association with the ED or parsed version of the ED.

In Step 202 according to one or more embodiments, a rank is generated for each of the candidate headings in the list of candidate headings. The rank of a candidate heading is a measure of the nesting level found in the sequence characters of the candidate heading. For example, the rank may correspond to the number of sequence characters segregated by punctuation(s) in the sequence characters of the candidate heading. The rank is stored as metadata in association with the ED or parsed version of the ED.

In Step 203 according to one or more embodiments, a confidence is generated for each of the candidate headings in the list of candidate headings. The confidence of a candidate heading is a measure of styling uniqueness of the particular candidate heading. For example, the styling uniqueness may correspond to a statistical measure (e.g., percentage) of characters in the ED that have a particular styling. The confidence may be stored as metadata in association with the ED or parsed version of the ED.

In Step 204, according to one or more embodiments, a list of chain fragments for inferring the sequence of section headings is generated based on the list of candidate headings. One or more candidate headings are grouped according to rank and family type into a chain fragment. In other words, all candidate heading(s) in a chain fragment have the same rank and same family type that define the rank and the family of chain fragment. Chain fragments are sorted according to respective ranks to form the list of chain fragments, and the confidence of each chain fragment is determined based on the confidence of each candidate heading included in the chain fragment. Further, one or more chain fragments with average confidence of the underlying candidate headings less than a predetermined confidence threshold are removed or otherwise excluded from the list of chain fragments. Information representing the list of chain fragments is then stored as metadata in association with the ED or parsed version of the ED.

In Step 205 according to one or more embodiments, the sequence of section headings is generated by merging chain fragments based on predetermined criteria, for example a proximity measure and a confidence measure of fragments to be merged. In particular, merging is performed according to respective ranks and families. Within the same family, a lower rank chain fragment is merged into a higher rank chain fragment that is one rank higher than the lower rank chain fragment. Further, a proximity measure between the higher rank chain fragment and the lower rank chain fragment is generated. For example, the proximity measure may correspond to a paragraph number difference between the insertion point in the higher rank chain fragment and the leading candidate heading in the lower rank chain fragment. In addition, a score of the higher rank chain fragment is generated based on a weighted average of the proximity measure and the confidence of the higher rank chain fragment. Accordingly, the higher rank chain fragment is selected as the parent of the lower rank chain fragment based on the score. For example, the higher rank chain fragment is selected as the parent of the lower rank chain fragment if its score is the highest among all possible higher rank chain fragments. Information representing the sequence of section headings is stored as metadata in association with the ED or parsed version of the ED.

Figure 2B:
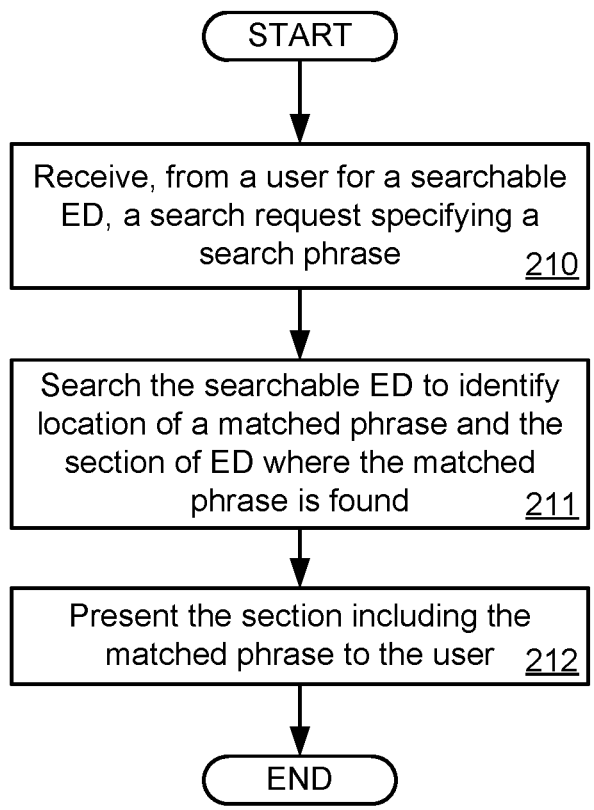

FIG. 2B shows a flowchart in accordance with one or more embodiments of the invention. The flowchart depicts a process for searching in an ED where sections and section headings semantically implied by the author are not specified or explicitly identified using computer-recognizable information, such as tags or other identifiers, in the ED. To enhance the search result, section heading information of the ED may be generated by the components of the system (100) discussed above in reference to FIG. 1, and using the method described in reference to FIG. 2A above. In one or more embodiments of the invention, one or more of the steps shown in FIG. 2B may be omitted, repeated, and/or performed in a different order than the order shown in FIG. 2B. Accordingly, the scope of the invention should not be considered limited to the specific arrangement of steps shown in FIG. 2B.

In Step 210, a search request specifying a search phrase is received from a user. In one or more embodiments of the invention, the user may open the ED in the file viewer. The user may open a search dialog box in the file viewer and type in a search phrase to search for one or more matched phrases that may lead to relevant information in the ED for the user.

In Step 211, the ED is searched to identify the location of one or more matched phrases. For example, multiple matched phrases may exist in the ED while some matched phrases are found in sections of the ED that are more relevant to the user than other matched phrases. Inferred section heading information is added to the ED that existing (e.g., legacy) search engines may use to return entire sections where a matched phrase is found. For example, the section heading information may be inferred and added to the ED prior to receiving the search request from the user. In another example, the section heading information may be inferred and added to the ED in response to receiving the search request from the user. The section heading information is inferred and added to the ED using the method described in reference to FIG. 2A above.

In one or more embodiments of the invention, the viewer search engine searches through the inferred section heading information to identify an entire section where a matched phrase is found. When a match is found, the file viewer obtains the location of the matched phrase and the section containing the matched phrase.

In Step 212, the matched phrase and the section containing the matched phrase are presented to the user in one or more embodiments of the invention. Presenting the matched phrase and the associated section may include highlighting the matched phrase in the associated section. Multiple sections containing multiple matched phrases are presented to the user such that the user may select the section containing most relevant information to the user.

As shown by FIGS. 2A and 2B, one or more embodiments allow for computerized searching of an ED to return not only the matched phrase(s), but also the section(s) of the ED where the matched phrase(s) are found. Thus, the user is able to view additional information related to the search phrase based on section headings semantically implied by the author that are not specified or explicitly identified using computer-recognizable information, such as tags or other identifiers, in the ED.

FIGS. 3C-3G show an implementation example in accordance with one or more embodiments of the invention. The implementation example shown in FIGS. 3C-3G is based on the system and method flowchart described in reference to FIGS. 1, 2A, and 2B above. In one or more embodiments of the invention, one or more of elements shown in FIGS. 3C-3G may be omitted, repeated, and/or organized in a different arrangement. Accordingly, the scope of the invention should not be considered limited to the specific arrangement of elements shown in FIGS. 3C-3G.

Figure 3C:
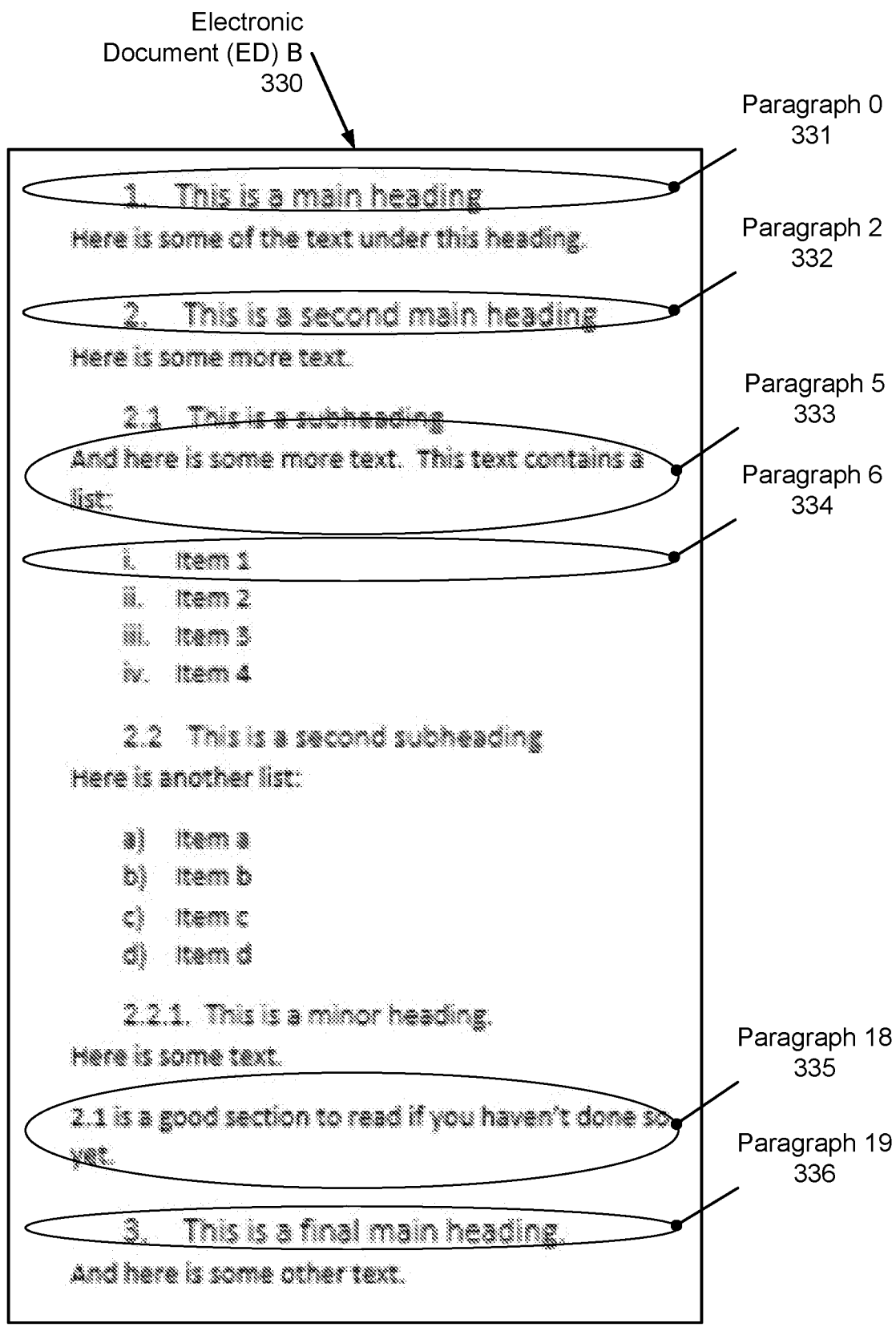

An example of generating the candidate headings with associated rank measure and confidence measure is described in reference to FIG. 3C and TABLE 1 below. As shown in FIG. 3C, the ED B (330) includes 21 paragraphs from paragraph 0 through paragraph 20, such as paragraph 0 (331), paragraph 2 (332), paragraph 5 (333), paragraph 6 (334), paragraph 18 (335), and paragraph 19 (336), etc. By using regular expressions to search for pieces of text that have a pattern of <sequence characters> <text>, the candidate headings in the ED are identified as a list of 16 row entries in TABLE 1 below. In particular, TABLE 1 shows an example of the list of candidate headings described in reference to Steps 201, 202, and 203 of FIG. 2A above.

TABLE 1

| Position | Family | RANK | Confidence | Text |
| --- | --- | --- | --- | --- |
| 0 | NUMERIC | 1 | 0.82 | 1. This is a main heading |
| 2 | NUMERIC | 1 | 0.82 | 2. This is a second main heading |
| 4 | NUMERIC | 2 | 0.88 | 2.1. This is a subheading |
| 6 | LOWERCASE ALPHABETIC | 1 | 0.36 | i. Item 1 |
| 6 | LOWERCASE ROMAN | 1 | 0.36 | i. Item 1 |
| 7 | LOWERCASE ROMAN | 1 | 0.36 | ii. Item 2 |
| 8 | LOWERCASE ROMAN | 1 | 0.36 | iii. Item 3 |
| 9 | LOWERCASE ROMAN | 1 | 0.36 | iv. Item 4 |
| 10 | NUMERIC | 2 | 0.88 | 2.2. This is a second subheading |
| 12 | LOWERCASE ALPHABETIC | 1 | 0.36 | a) Item a |
| 13 | LOWERCASE ALPHABETIC | 1 | 0.36 | b) Item b |
| 14 | LOWERCASE ALPHABETIC | 1 | 0.36 | c) Item c |
| 15 | LOWERCASE ALPHABETIC | 1 | 0.36 | d) Item d |
| 16 | NUMERIC | 3 | 0.94 | 2.2.1. This is a minor heading. |
| 18 | NUMERIC | 2 | 0.36 | 2.1 is a good section to read if you haven . . . |
| 19 | NUMERIC | 1 | 0.82 | 3. This is a final main heading. |

In the list of candidate headings of TABLE 1, the position of a candidate heading identifies the paragraph number of the candidate heading in the ED B (330). Throughout this disclosure, the term "position" means "the position of a candidate heading" unless otherwise stated. The rank of a candidate heading is a number of sequence characters in the candidate heading. The rank indicates the nesting level for the candidate heading. For example, a candidate heading with sequence character "3." is at rank 1 whereas a candidate heading with sequence characters "2.1" is at rank 2 while a candidate heading with sequence characters "2.2.1" is at rank 3 and so on.

The confidence of a candidate heading indicates the styling uniqueness of the particular candidate heading. Generally, headings implied by the author of the ED have a unique style when compared to the rest of text in the ED. For example, paragraph 0 (331), paragraph 2 (332), and paragraph 19 (336) are all main headings implied by the author and share a common styling, which is unique to only these paragraphs. Hence, the confidence for these candidate headings is computed as 1 minus the quotient of the number of characters with this particular common styling divided by the total number of characters in the ED. In the example of ED B (330), there are 90 characters across paragraph 0 (331), paragraph 2 (332), and paragraph 19 (336), and 503 characters in total. Therefore, the confidence of each of the paragraph 0 (331), paragraph 2 (332), and paragraph 19 (336) is computed as 1−90/503, which is equal to 0.82, as listed in TABLE 1 above.

In particular, note that paragraph 6 (334) is identified in TABLE 1 as two heading candidates, one as LOWERCASE ALPHABETIC and the other as LOWERCASE ROMAN. This is due to ambiguity of "i." as being both an alphabetic letter and a roman numeral. In other words, one or more candidate headings in the ED may be categorized as belonging to multiple families due to ambiguity that is resolved in a later step.

As an example in reference to Step 204 of FIG. 2A above, a number of chain fragments of the sequence of section headings are generated from the candidate headings based on the rank measure. As noted above, a chain fragment, or simply referred to as a fragment, is one or more candidate headings to be qualified as a portion of the sequence of section headings. A candidate heading having a leading sequence character (i.e., '1.' for NUMERIC, 'A.' for UPPERCASE ALPHABETIC, or 'i.' for LOWERCASE ROMAN, etc.) in the rightmost digit of the sequence characters either forms a single-heading chain fragment or acts as a start of a chain fragment having multiple candidate headings. The sequence characters of multiple candidate headings in a chain fragment follow each other from the start of the chain fragment. In one or more embodiments, a chain fragment is generated by walking backwards from the list of candidate headings to search for the start of the chain fragment. As used herein, "backwards" means towards the beginning or top of TABLE 1, while "forward" means towards the end or bottom of TABLE 1. The start of the chain fragment is also referred to as the chain fragment start. For example, the following sequence characters may all denote the start of a chain fragment. In other words, a candidate heading including the following sequence characters may be identified as a potential chain fragment start.

4.1
4.2.1
4.3.1
1.
i.
a)

Once a potential chain fragment start has been identified, the chain fragment is built in sequence by searching for subsequent candidate headings of the same rank and same family that have the same text styling as the potential chain fragment start, and that have not already been incorporated into other chain fragments. Disambiguation of different interpretations occurs during this step. For example, 'i.' found in a candidate heading is distinguished as either the start of a roman numeral chain or as the 9th entry in an alphabetic chain. In particular, the distinction is based on whether a chain fragment is generated using "i." as the chain fragment start. In other words, if a chain fragment is generated using "i." as the chain fragment start, then "i." is treated as a roman numeral. Otherwise, if no chain fragment is generated using "i." as the chain fragment start, then "i." is treated as an alphabetic letter.

Continuing with the example of FIG. 3C and TABLE 1 above, the algorithm starts with paragraph 19 (336) and finds that the sequence characters of this candidate heading ends with a 3 and does not start a chain fragment. The next candidate heading counting backwards from the end of TABLE 1 is paragraph 18 (335) that has the sequence characters 2.1 ending with a 1. Therefore, the paragraph 18 (335) is selected as starting a chain fragment. From the selected paragraph 18 (335), the algorithm then walks forward towards the end of TABLE 1 searching for the next sequence characters 2.2 in a candidate heading with the same styling as the paragraph 18 (335). However, such a candidate heading is not found in the list of TABLE 1 and this concludes the chain fragment 1 having a single candidate heading as shown in TABLE 2 below.

TABLE 2

| CHAIN FRAGMENT 1: | | | | |
|---|---|---|---|---|
| Position | Family | RANK | Confidence | Text |
| 18 | NUMERIC | 2 | 0.36 | 2.1 is a good section to read if you haven . . . |

Similar to the paragraph 18 in the list of TABLE 1, paragraph 16 is identified as a chain fragment start form which chain fragment 2 is generated with a single candidate heading as shown in TABLE 3 below.

TABLE 3

| CHAIN FRAGMENT 2: | | | | |
|---|---|---|---|---|
| Position | Family | RANK | Confidence | Text |
| 16 | NUMERIC | 3 | 0.94 | 2.2.1. This is a minor heading. |

The algorithm continues walking backwards in the list of TABLE 1 and identifies the paragraph 12 as a chain fragment start based on the 'a)' at the leftmost digit of the sequence characters. The algorithm then moves forwards in TABLE 1 searching for the next candidate heading that shares the same family (LOWERCASE ALPHABETIC) and styling and is sequentially next in line. Accordingly, paragraphs 13, 14 and 15 are included in the chain fragment 3 as shown in TABLE 4 below.

TABLE 4

| CHAIN FRAGMENT 3: | | | | |
|---|---|---|---|---|
| Position | Family | RANK | Confidence | Text |
| 12 | LOWERCASE ALPHABETIC | 1 | 0.36 | a) Item a |
| 13 | LOWERCASE ALPHABETIC | 1 | 0.36 | b) Item b |

TABLE 4-continued

CHAIN FRAGMENT 3:

| Position | Family | RANK | Confidence | Text |
|---|---|---|---|---|
| 14 | LOWERCASE ALPHABETIC | 1 | 0.36 | c) Item c |
| 15 | LOWERCASE ALPHABETIC | 1 | 0.36 | d) Item d |

The algorithm again continues backwards in the list of TABLE 1 and identifies the paragraph 6 as a potential chain fragment start. Here, there are two possible interpretations for 'i.' in the candidate heading. The first interpretation of 'i.' as LOWERCASE ALPHABETIC is not identified as a potential chain fragment start and is ignored. The second interpretation of 'i.' as LOWERCASE ROMAN is identified as a potential chain fragment start and is adopted by the algorithm to proceed further. Accordingly, the chain fragment 4 is generated using the paragraph 6 as the chain fragment start as shown in TABLE 5 below.

TABLE 5

CHAIN FRAGMENT 4:

| Position | Family | RANK | Confidence | Text |
|---|---|---|---|---|
| 6 | LOWERCASE ROMAN | 1 | 0.36 | i. Item 1 |
| 7 | LOWERCASE ROMAN | 1 | 0.36 | ii. Item 2 |
| 8 | LOWERCASE ROMAN | 1 | 0.36 | iii. Item 3 |
| 9 | LOWERCASE ROMAN | 1 | 0.36 | iv. Item 4 |

Similarly, chain fragments 5 and 6 are generated as shown in TABLE 6 and TABLE 7 below.

TABLE 6

CHAIN FRAGMENT 5:

| Position | Family | RANK | Confidence | Text |
|---|---|---|---|---|
| 4 | NUMERIC | 2 | 0.88 | 2.1. This is a subheading |
| 10 | NUMERIC | 2 | 0.88 | 2.2. This is a second subheading |

TABLE 7

CHAIN FRAGMENT 6:

| Position | Family | RANK | Confidence | Text |
|---|---|---|---|---|
| 0 | NUMERIC | 1 | 0.82 | 1. This is a main heading |
| 2 | NUMERIC | 1 | 0.82 | 2. This is a second main heading |
| 19 | NUMERIC | 1 | 0.82 | 3. This is a final main heading. |

As described above in reference to Step 204 of FIG. 2A, the chain fragments are sorted by rank. In one or more embodiments, all chain fragments at rank 1 are first added to a list of fragments, followed by all chain fragments at rank 2, then rank 3 and so on. An example of the sorted list of fragments (340) generated from the ED B (330) is shown in FIG. 3D. As shown in FIG. 3D, the chain fragment 6 (346), chain fragment 4 (344), and chain fragment 3 (343) are included in rank 1 portion of the list of fragments (340); the chain fragment 5 (345) and chain fragment 1 (341) are included in rank 2 portion of the list of fragments (340); and the chain fragment 2 (342) is included in rank 3 portion of the list of fragments (340).

Further, disqualified chain fragments are removed from the list of fragments. Once all chain fragments have been built, the algorithm then proceeds to prune chain fragments that are unlikely to form larger sequence chains. In one or more embodiments, chain fragments that are identified as lists or as chain fragments that fall below a certain confidence threshold are disqualified and removed from the list of fragments.

A chain fragment is identified as a list if the "list probability" of the chain fragment falls above a particular threshold. The "list probability" is computed as the ratio of the number of adjacent candidate headings in the chain fragment to the total number of candidate headings in the chain fragment. For example, the chain fragment 6 (346) consisting of paragraphs 0, 2, and 19 have 0 adjacent candidate headings because 0, 2, and 19 are not adjacent paragraph positions. Therefore, the "list probability" of the chain fragment 6 (346) is 0/3=0. In another example, the chain fragment 4 (344) consisting of paragraphs 6, 7, 8, and 9 have 4 adjacent paragraphs and the "list probability" is 4/4=1. A chain fragment having a single candidate heading is not considered for pruning based on "list probability" as there is not enough context to identify whether the chain fragment is an isolated heading or a list of one element.

The confidence of a chain fragment is computed as the average of the confidences of all candidate headings of the chain fragment. For example, the confidence of the chain fragment 5 (345) having paragraphs 4 and 10 is computed as 0.88. Chain fragments with a confidence below a specified threshold are also pruned.

In one or more embodiments, a "list probability" threshold of 1 and a chain fragment confidence threshold of 0.8 are used. Accordingly, the chain fragment 4 (344) consisting of paragraphs 6, 7, 8, and 9; the chain fragment 3 (346) consisting of paragraphs 12, 13, 14, and 15; and the chain fragment 1 (341) consisting of paragraph 18 are removed from the list of fragments (340) to generate a pruned list of fragments (350), as shown in FIG. 3E.

As an example in reference to Step 205 of FIG. 2A above, the sequence of section headings is generated from the pruned list of fragments by merging lower rank chain fragments into higher rank chain fragments. Starting with chain fragments at the lowest rank, a possible parent for each chain fragment is located. Of all possible parents, the best parent is chosen such that the parent and child chain fragments are merged. This process repeats to move higher in ranks of the chain fragments.

In one or more embodiments, merging chain fragments at a particular rank is based on the process below.

Sort all chain fragments at a particular rank by decreasing confidence to process the most confident chain fragments first.

For each chain fragment in the sorted list above:
  a. Generate a list of all parent chain fragments (potential_parents) that the chain fragment may potentially fit in. The set of parent chain fragments to search through is one rank higher than the rank of the current chain fragment. So, for each parent chain fragment in the set of chain fragments one rank above, if the chain fragment potentially fits within the parent chain fragment, then the parent chain fragment and the position of a parent heading it fits after (parent_pos) is added to the list potential_parents. In other words, the parent heading is the candidate heading after which the child chain fragment may be inserted for merging. A function Fits Within( ) is used that will be described in detail below.
  b. For each fragment in the potential_parents, identify the distance from parent_pos to the position of the first candidate heading in the child chain fragment and record the maximum distance as max_dist.
  c. Identify the best parent chain fragment in potential_parents. This is done using a combination of proximity and chain fragment confidence. A function ScoreFit( ) is applied to each parent chain fragment to select the parent chain fragment with the highest score.
  d. Merge the chain fragment into the best parent chain fragment. Specifically, each candidate heading in the chain fragment is moved into the best parent chain fragment and the now empty chain fragment is deleted.

Here is an example expansion of the function Fits Within( ):

For each heading in the parent chain fragment, execute the steps below:
  a. Identify the next heading in the parent chain fragment after the current parent heading, if present, and designate it as next_heading.
  b. Identify a placement_fit for the child chain fragment. The placement_fit is true if the first heading position in the child chain fragment is greater than the current parent heading position parent_pos, and either 1) there is no next_heading or 2) there is a next_heading and the last heading position in the child chain fragment is less than the position of next_heading.
  c. Identify a sequence_fit for the child chain fragment. The sequence_fit is true if the first heading position in the child chain fragment follows the sequence characters of the current parent heading. For example, both 2.3 and 2.2.1 follows 2.2 and would qualify for a sequence fit whereas 2.2.2 and 2.4 does not follow 2.2 and would disqualify for a sequence fit. The check of whether or not one candidate heading follows another is handled in the function Follows( ) that is described later.
  d. If there is both a placement_fit and a sequence_fit for the current parent heading, identify this parent fragment and the parent heading (parent_pos) after which to insert the child chain fragment and exit the loop.

If a parent fragment has been identified, then verify that the parent fragment does not have sequence characters that match the sequence characters of the first heading in the child chain fragment. In other words, verify that the child chain fragment intended to be added is not already present in the parent chain fragment. If it is, or no suitable parent heading is located, then return 'NULL' for the parent fragment and return '−1' for parent_pos. Otherwise, return a reference to the parent fragment and parent_pos.

Here is an example expansion of the function ScoreFit( ):

Calculate a distance score based on the distance from the child chain fragment to the parent chain fragment. For example, dist_score=1.0—(difference between position of first heading in child chain fragment and parent_pos)/max_dist.

Calculate a confidence_score as the average confidence of all headings in the parent chain fragment.

Return a weighted average of the dist_score and the confidence_score. As the final_score. For example, final_score=0.75*dist_score+0.25*confidence_score.

Here is an example expansion of the function Follows(a, b) to determine whether heading b follows heading a:

Build an array of numeric levels corresponding to both a and b. The size of the array is equal to the heading's rank, and each entry in the array is the numerical equivalent of each character entry in the sequence. Here are a few examples of the numeric levels for some different sequenced headings:

| Family | Heading | Numeric Level Array | | | |
|---|---|---|---|---|---|
| NUMERIC | 1.2. | 1 | | 2 | |
| NUMERIC | 1.2.4.1. | 1 | 2 | 4 | 1 |
| LOWERCASE_ALPHABETIC | a) | | | 1 | |
| LOWERCASE_ROMAN | iv. | | | 4 | |
| LOWERCASE_ALPHABETIC | a.d. | 1 | | 4 | |

Initialize a bool found_an_increment to false.

Repeat for each entry in the numeric levels array of b:
  a. Identify the position of this entry and call it entry_num.
  b. If found_an_increment is true, return false. (Rationale: If an increment has already been found, then there shouldn't be any more entries in b's numeric levels array. Example: 4.2.1.1 does not follow 4.2.)
  c. If the entry number is less than the size of a's numeric levels array, then:
    i. If b's numeric levels array at entry_num is less than a's numeric levels array at entry_num, return false. (Example: 4.2.1 does not follow 4.2.3 because 1 is less than 3.)
    ii. If b's numeric levels array at entry_num is equal to a's numeric levels array at entry_num added to 1, then set found_an_increment to true. Otherwise, if b's numeric levels array at entry_num does not equal a's numeric levels array at entry_num, return false. (Rationale: If b's value is greater than a's corresponding value by 1, then an increment was found. Otherwise, only continue to the next entry in the numeric levels array if the current corresponding values are equal. Example: 4.2.2 follows 4.2.1)
  d. Otherwise if the entry number is equal to the size of a's numeric levels array, then:
    i. If b's numeric levels array at entry_num is equal to 1, then set found_an_increment to true. (Example: 4.2.1 follows 4.2).

Return found_an_increment.

Continuing with the discussion of the pruned list of fragments (350) shown in FIG. 3E above, the process of merging chain fragments starts with all chain fragments at the lowest rank, which is 3 in the fragment 2 (342). All chain fragments at this rank are sorted by decreasing confidence. With only one chain fragment (i.e., fragment 2 (342)) at rank 3 the sorting has no effect. The process of merging chain fragments starts with all the chain fragments at one rank higher, which is rank 2. In the pruned list of fragments (350), there is only one chain fragment (i.e., fragment 5 (345)) at rank 2. The function Fits Within( ) is applied to determine whether the fragment 2 (342) at rank 3 fits as a child fragment within the fragment 5 (345) at rank 2 as the parent fragment.

Inside FitsWithin( ), each heading in the fragment 5 (345) at rank 2 is evaluated. The first heading corresponds to paragraph 4 as below.

| Position | Family | RANK | Confidence | Text |
|---|---|---|---|---|
| 4 | NUMERIC | 2 | 0.88 | 2.1. This is a subheading |

For this heading, placement_fit is false because there is a next heading (position 10) in the fragment 5 (345) and the last heading position 16 in the fragment 2 (342) is not less than the position 10 of the next heading. Furthermore, sequence_fit is false because the sequence characters 2.2.1 in the fragment 2 (342) does not follow the sequence characters 2.1 in the fragment 5 (345). Therefore, the evaluation of Fits Within( ) continues to the next heading in the fragment 5 (345) at rank 2. The next heading corresponds to paragraph 10 as below.

| Position | Family | RANK | Confidence | Text |
|---|---|---|---|---|
| 10 | NUMERIC | 2 | 0.88 | 2.2. This is a second subheading |

For this heading, placement_fit is true because there is no next heading in the fragment 5 (345) and the first heading position 16 in the child fragment 2 (342) is greater than the current parent heading position 10 in the parent fragment 5 (345). Furthermore, sequence_fit is true because the sequence characters 2.2.1 in the child fragment 2 (342) follows the sequence characters 2.2 in the parent fragment 5 (345).

Finally, it is verified that there is not already a heading with sequence characters of 2.2.1 in the fragment 5 (345) at rank 2. Given that the parent fragment does not already contain the child fragment, Fits Within( ) returns the fragment 5 (345) as the parent fragment and a parent_pos of 10, which are added to the list of potential parents.

Given that there is only one potential parent in the list, the fragment 5 (345) at rank 2 is selected as the best parent for the fragment 2 (342) at rank 3. Accordingly, the fragment 2 (342) at rank 3 is merged into the fragment 5 (345) at rank 2 to generate a merged list of fragments A (360) shown in FIG. 3F. As shown in FIG. 3F, the merged list of fragments A (360) includes the fragment 6 (346) at rank 1 and the merged fragment A (361) at rank 2. In particular, the merged fragment A (361) is a combination of the fragment 2 (342) and the fragment 5 (345) in the pruned list of fragments (350).

There are no more chain fragments remaining at rank 3, so the merging process repeats a second time in the merged list of fragments A (360) with all chain fragments at rank 2, which include only the merged fragment A (361). According to the merging process, all chain fragments at rank 2 are sorted by decreasing confidence. With only one chain fragment (i.e., merged fragment A (361)), the sorting has no effect. Accordingly, the process of merging chain fragments starts with all the chain fragments at one rank higher, which is rank 1. In the merged list of fragments A (360), there is only one chain fragment (i.e., fragment 6 (346)) at rank 1. The function FitsWithin( ) is applied to determine whether the merged fragment A (361) at rank 2 fits as a child fragment within the fragment 6 (346) at rank 1 as the parent fragment.

Inside FitsWithin( ), each heading in the fragment 6 (346) at rank 1 is evaluated. The first heading corresponds to paragraph 0 as below.

| Position | Family | RANK | Confidence | Text |
|---|---|---|---|---|
| 0 | NUMERIC | 1 | 0.82 | 1. This is a main heading |

For this heading, placement_fit is false because there is a next heading (position 2) in the fragment 6 (346) and the last heading position 16 in the merged fragment A (361) is not less than the position 2 of the next heading. Furthermore, sequence_fit is false because the sequence characters 2.1 in the merged fragment A (361) does not follow the sequence character 1 in the fragment 6 (346). Therefore, the evaluation of FitsWithin( ) continues to the next heading in the fragment 6 (346) at rank 1. The next heading corresponds to paragraph 2 as below.

| Position | Family | RANK | Confidence | Text |
|---|---|---|---|---|
| 2 | NUMERIC | 1 | 0.82 | 2. This is a second main heading |

For this heading, placement_fit is true because the first heading position 4 in the merged child fragment A (361) is greater than the current parent heading position 2 in the parent fragment 6 (346). In addition, the last heading position 16 in the merged child fragment A (361) is less than the next heading position 19 in the parent fragment 6 (346). Furthermore, sequence_fit is true because the sequence characters 2.1 in the merged child fragment A (361) follows the sequence character 2 in the parent fragment 6 (346).

Finally, it is verified that there is not already a heading with sequence characters of 2.1 in the fragment 6 (346) at rank 1. Given that the parent fragment does not already contain the child fragment, Fits Within( ) returns the fragment 6 (346) as the parent fragment and a parent_pos of 2, which are added to the list of potential parents.

Given that there is only one potential parent in the list, the fragment 6 (346) is selected as the best parent for the merged fragment A (361) at rank 2. Accordingly, the merged fragment A (361) at rank 2 is merged into the fragment 6 (346) at rank 1 to generate a merged list of fragments B (370) shown in FIG. 3G. As shown in FIG. 3G, the merged list of fragments B (370) includes only the merged fragment B (371) at rank 1. In particular, the merged fragment B (371) is a combination of the merged fragment A (361) and the fragment 6 (346) in the merged list of fragments A (360).

The merging process has now completed and the merged fragment B (371) is identified as the sequenced headings, or the sequence of section headings of the ED B (330). From this information, sections may be automatically identified as the text regions between section headings and the overall nesting of sections in the document can be identified from rank information allowing queries such as "show me the section about . . . " to be answered.

In various steps of the example described above, inferred metadata is generated for intermediate results in one or more embodiments of the invention. In particular, the inferred metadata includes representations of the list of candidate headings, associated ranks and confidence, the list of chain fragments, associated scores and parent/child relationships, etc. In one or more embodiments of the invention, the inferred metadata is added to the ED and/or parsed version of the ED.

Figure 4:
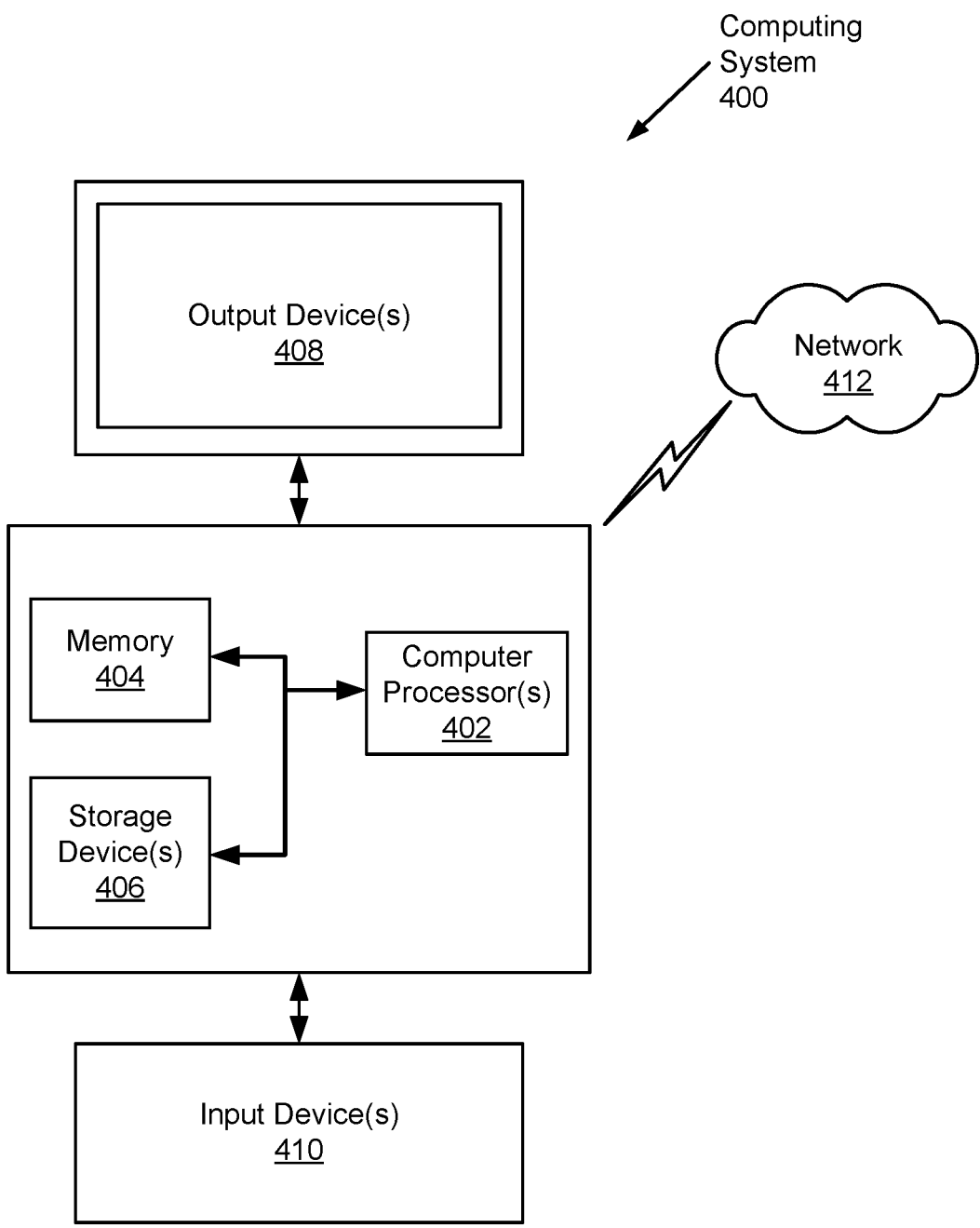
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document (ED) to infer a sequence of section headings in the ED, the method comprising:
generating, by a computer processor, based on regular expression matching of a predetermined section heading pattern and a plurality of characters in the ED, a list of candidate headings in the ED, wherein each of the plurality of candidate headings comprises one or more sequence characters according to the predetermined section heading pattern;
generating, by the computer processor and based on the list of candidate headings, a list of chain fragments for inferring a portion of the sequence of section headings, wherein generating the list of chain fragments comprises:
determining a rank of each candidate heading in the list of candidate headings based on a nesting level of the sequence characters,
wherein each chain fragment in the list of chain fragments comprises one or more candidate headings having a single rank that defines the rank of said each chain fragment,
wherein the list of chain fragments comprises a plurality of ranks different from each other; and
generating, by the computer processor and based on predetermined criteria, the sequence of section headings by merging at least two chain fragments in the list of chain fragments, wherein merging the at least two chain fragments comprises:
determining a proximity measure between a higher rank chain fragment and a lower rank chain fragment in the list of chain fragments, wherein the higher rank chain fragment is one of a plurality of higher rank chain fragments that are one rank higher than the lower rank chain fragment, wherein each of the plurality of higher rank chain fragments has one less nesting level than the lower rank chain fragment;

generating a score of each higher rank chain fragment based on a weighted average of the proximity measure and a confidence of said each higher rank chain fragment; and selecting, based on the score and from the plurality of higher rank chain fragments in the list of chain fragments, the higher rank chain fragment to merge the lower rank chain fragment.

2. The method of claim 1, further comprising:

generating a parsed version of the ED, wherein the parsed version of the ED comprises styling attributes of the plurality of characters in the ED; and determining, based on a uniqueness measure of the styling attributes, a confidence of each candidate heading in the list of candidate headings.

3. The method of claim 2, further comprising:

determining, based on the confidence of each candidate heading in the list of candidate headings, a confidence of each chain fragment in the list of chain fragments; and excluding, based on a predetermined confidence threshold and the confidence of each chain fragment, at least one chain fragment from the list of chain fragments for inferring the sequence of section headings.

4. The method of claim 1, wherein generating the list of chain fragments further comprises:

traversing backwards in the list of candidate headings to identify a leading candidate heading for each chain fragment in the list of chain fragments; and traversing, from the leading candidate heading, forward in the list of candidate headings to identify remaining candidate headings in said each chain fragment, wherein the leading candidate heading includes a leading sequence character in the rightmost digit of the sequence characters.

5. The method of claim 4, wherein the list of chain fragments is sorted according to the rank of each chain fragment in the list of chain fragments.

6. A non-transitory computer readable medium (CRM) storing computer readable program code for processing an electronic document (ED) to infer a sequence of section headings in the ED embodied therein, wherein the computer readable program code, when executed by a computer, comprises functionality for:

generating, based on regular expression matching of a predetermined section heading pattern and a plurality of characters in the ED, a list of candidate headings in the ED, wherein each of the plurality of candidate headings comprises one or more sequence characters according to the predetermined section heading pattern;

generating, based on the list of candidate headings, a list of chain fragments for inferring a portion of the sequence of section headings, wherein generating the list of chain fragments comprises:

determining a rank of each candidate heading in the list of candidate headings based on a nesting level of the sequence characters, wherein each chain fragment in the list of chain fragments comprises one or more candidate headings having a single rank that defines the rank of said each chain fragment, wherein the list of chain fragments comprises a plurality of ranks different from each other; and generating, based on predetermined criteria, the sequence of section headings by merging at least two chain fragments in the list of chain fragments, wherein merging the at least two chain fragments comprises:

determining a proximity measure between a higher rank chain fragment and a lower rank chain fragment in the list of chain fragments, wherein the higher rank chain fragment is one of a plurality of higher rank chain fragments that are one rank higher than the lower rank chain fragment, wherein each of the plurality of higher rank chain fragments has one less nesting level than the lower rank chain fragment;

generating a score of each higher rank chain fragment based on a weighted average of the proximity measure and a confidence of said each higher rank chain fragment; and selecting, based on the score and from the plurality of higher rank chain fragments in the list of chain fragments, the higher rank chain fragment to merge the lower rank chain fragment.

7. The CRM of claim 6, the computer readable program code, when executed by the computer, further comprising functionality for: generating a parsed version of the ED, wherein the parsed version of the ED comprises styling attributes of the plurality of characters in the ED; and determining, based on a uniqueness measure of the styling attributes, a confidence of each candidate heading in the list of candidate headings.

8. The CRM of claim 7, the computer readable program code, when executed by the computer, further comprising functionality for: determining, based on the confidence of each candidate heading in the list of candidate headings, a confidence of each chain fragment in the list of chain fragments; and excluding, based on a predetermined confidence threshold and the confidence of each chain fragment, at least one chain fragment from the list of chain fragments for inferring the sequence of section headings.

9. The CRM of claim 6, wherein generating the list of chain fragments further comprises: traversing backwards in the list of candidate headings to identify a leading candidate heading for each chain fragment in the list of chain fragments; and traversing, from the leading candidate heading, forward in the list of candidate headings to identify remaining candidate headings in said each chain fragment, wherein the leading candidate heading includes a leading sequence character in the rightmost digit of the sequence characters.

10. The CRM of claim 6, wherein the list of chain fragments is sorted according to the rank of each chain fragment in the list of chain fragments.

11. A system for processing an electronic document (ED) to infer a sequence of section headings in the ED, the system comprising: a memory; and a computer processor connected to the memory and configured to:

generate, based on regular expression matching of a predetermined section heading pattern and a plurality of characters in the ED, a list of candidate headings in the ED, wherein each of the plurality of candidate headings comprises one or more sequence characters according to the predetermined section heading pattern;

generate, based on the list of candidate headings, a list of chain fragments for inferring a portion of the sequence of section headings, wherein generating the list of chain fragments comprises:

determining a rank of each candidate heading in the list of candidate headings based on a nesting level of the sequence characters, wherein each chain fragment in the list of chain fragments comprises one or more candidate headings having a single rank that defines the rank of said each chain fragment, wherein the list of chain fragments comprises a plurality of ranks different from each other; and generate, based on predetermined criteria, the sequence of section headings by merging at least two chain fragments in the list of chain fragments, wherein merging the at least two chain fragments comprises:

determining a proximity measure between a higher rank chain fragment and a lower rank chain fragment in the list of chain fragments, wherein the higher rank chain fragment is one of a plurality of higher rank chain fragments that are one rank higher than the lower rank chain fragment, wherein each of the plurality of higher rank chain fragments has one less nesting level than the lower rank chain fragment;

generating a score of each higher rank chain fragment based on a weighted average of the proximity measure and a confidence of said each higher rank chain fragment; and selecting, based on the score and from the plurality of higher rank chain fragments in the list of chain fragments, the higher rank chain fragment to merge the lower rank chain fragment.

12. The system of claim 11, the computer processor further configured to:

generate a parsed version of the ED, wherein the parsed version of the ED comprises styling attributes of the plurality of characters in the ED; and determine, based on a uniqueness measure of the styling attributes, a confidence of each candidate heading in the list of candidate headings.

13. The system of claim 12, the computer processor further configured to:

determine, based on the confidence of each candidate heading in the list of candidate headings, a confidence of each chain fragment in the list of chain fragments; and exclude, based on a predetermined confidence threshold and the confidence of each chain fragment, at least one chain fragment from the list of chain fragments for inferring the sequence of section headings.

14. The system of claim 11, wherein generating the list of chain fragments further comprises:

traversing backwards in the list of candidate headings to identify a leading candidate heading for each chain fragment in the list of chain fragments; and traversing, from the leading candidate heading, forward in the list of candidate headings to identify remaining candidate headings in said each chain fragment, wherein the leading candidate heading includes a leading sequence character in the rightmost digit of the sequence characters.

15. The system of claim 11, wherein the list of chain fragments is sorted according to the rank of each chain fragment in the list of chain fragments.

* * * * *